(12) United States Patent
Stewart

(10) Patent No.: US 6,923,069 B1
(45) Date of Patent: Aug. 2, 2005

(54) TOP SIDE REFERENCE CAVITY FOR ABSOLUTE PRESSURE SENSOR

(75) Inventor: Carl E. Stewart, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/967,536

(22) Filed: Oct. 18, 2004

(51) Int. Cl.⁷ .............................................. G01L 9/00
(52) U.S. Cl. ..................................................... 73/723
(58) Field of Search ....................... 73/706, 715–727, 73/754, 756; 361/283.1–283.4

(56) References Cited

U.S. PATENT DOCUMENTS

| | | | |
|---|---|---|---|
| 4,951,174 A * | 8/1990 | Grantham et al. ........ | 361/283.4 |
| 6,164,742 A * | 12/2000 | Hauck ............................ | 347/6 |
| 6,756,248 B2 | 6/2004 | Ikeda et al. ..................... | 438/53 |
| 6,773,951 B2 | 8/2004 | Eriksen et al. ................ | 438/53 |
| 6,782,755 B2 | 8/2004 | Tai et al. ....................... | 73/754 |
| 2003/0205090 A1 | 11/2003 | Jakobsen ..................... | 73/718 |
| 2003/0233884 A1 | 12/2003 | Bodin .......................... | 73/756 |
| 2004/0020303 A1 | 2/2004 | Blomberg .................... | 73/718 |
| 2004/0021209 A1 | 2/2004 | Sblono et al. .............. | 257/682 |

* cited by examiner

Primary Examiner—William Oen
(74) Attorney, Agent, or Firm—Kris T. Fredrick; Kermit D. Lopez; Luis M. Ortiz

(57) ABSTRACT

A pressure sensor includes a silicon diaphragm having bottom and topside surfaces. The bottom surface has been formed using methods known to those skilled in the art. A first layer is formed and patterned on the topside surface of the diaphragm having an area larger than the diaphragm. A second layer is formed and patterned over the first layer, the second layer being larger in area than the first layer. Holes formed in the second layer are used to remove the first layer using methods known to those skilled in the art. A third layer is formed and patterned over the second layer. The third layer seals the holes in the second layer creating a sealed cavity with a reference pressure on the topside surface of the diaphragm. During operation, media is applied to the bottom surface of the diaphragm wherein the media pressure can be sensed by the pressure sensor in relation to the reference pressure sealed on the topside of the diaphragm.

13 Claims, 1 Drawing Sheet

TOP SIDE REFERENCE CAVITY FOR ABSOLUTE PRESSURE SENSOR

FIELD OF THE INVENTION

The present invention is generally related to pressure sensors. More particularly, the present invention is related to silicon-based absolute pressure sensors, used with corrosive media such as auto exhaust fumes, sensors that are made more robust by exposing the silicon backside of the sensor's diaphragm to the media rather than the top side.

BACKGROUND

Pressure sensors find wide use in industry: U.S. Pat. No. 6,452,427, U.S. Pat. No. 6,445,053, U.S. Pat. No. 6,229,190, U.S. Pat. No. 6,167,763, U.S. Pat. No. 6,112,598, U.S. Pat. No. 5,808,210, U.S. Pat. No. 5,747,705, U.S. Pat. No. 5,585,311, U.S. Pat. No. 5,535,135, U.S. Pat. No. 5,528,452, U.S. Pat. No. 5,459,351, U.S. Pat. No. 5,453,628, U.S. Pat. No. 5,155,061 U.S. Pat. No. 4,098,133, U.S. Pat. No. 4,008,619.

The topside of a typical pressure sensor includes implanted piezoresistors to convert the pressure to an electrical signal, contacts to metal interconnections and bond pads used for wire bonding. This exposes materials other than silicon that must be protected from the sensed media. A typical pressure sensor can fail if the topside protection is compromised. Such failure is common with pressure sensors. What is needed is a pressure sensor design that will reduce its failure rate.

SUMMARY OF THE INVENTION

The present inventor has designed a pressure sensor that overcomes failures associated with media induced failure occurring on the sensors topside.

It is a feature of the present invention to provide a semiconductor-based pressure sensor adapted with a sealed reference cavity covering the topside of the sensor's diaphragm. The sealed reference cavity can be created by applying materials to the topside of the diaphragm using materials and methods commonly employed in the semiconductor industry. Layers of material applied to the topside of the diaphragm are used to create a sealed reference cavity for the pressure sensor. A laser, as well as other methods known to those skilled in the art, can be used to cut holes in the layers and remove an under-layer creating a cavity. The holes can then be sealed at a reference pressure thereby creating the sealed reference cavity. The reference cavity allows the media pressure to be applied to the backside of the diaphragm and the pressure measured with respect to the reference pressure sealed on the topside of the diaphragm.

In accordance with another feature of the present invention, a pressure sensor with a silicon diaphragm including bottom surface and top surface, said diaphragm having been formed using methods known to those skilled in the art. A first layer is formed on the topside surface, wherein the area of the first layer is larger than the diaphragm, and a second layer formed over the first layer, said second layer area being larger than the first layer and having holes formed therein allowing the first layer to be removed from under the second layer creating a cavity between the second layer and the top of the diaphragm. A third layer is formed over the second layer at a reference pressure. The third layer seals the holes in the second layer creating a sealed cavity with the reference pressure on the topside of the diaphragm.

In accordance with yet another feature of the present invention, a media to be sensed by the pressure sensor is applied to the bottom surface of the diaphragm wherein the media pressure will be sensed by the pressure sensor. The sealed reference cavity on the topside of the diaphragm provides a reference pressure for measuring the pressure of the media on the backside of the diaphragm.

DETAILED DESCRIPTION

Figure 1:
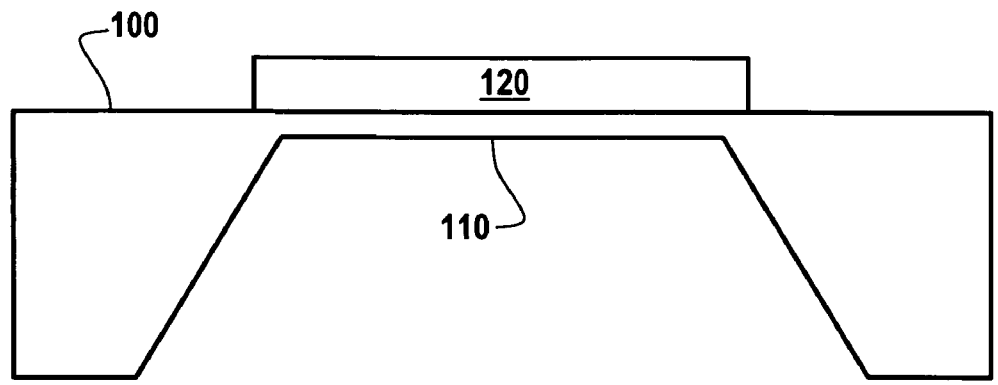
FIG. 1 illustrates a side view of a pressure sensor having a diaphragm and covered by a first layer.

Referring to FIG. 1, a silicon substrate 100 has a diaphragm 110 formed using methods known by those skilled in the art. The diaphragm 110 includes a bottom surface where the media pressure to be measured is applied. A first layer 120 is formed on/deposited over the topside surface. The area of the first layer 120 is patterned to be larger than the diaphragm 110 area.

Figure 2:
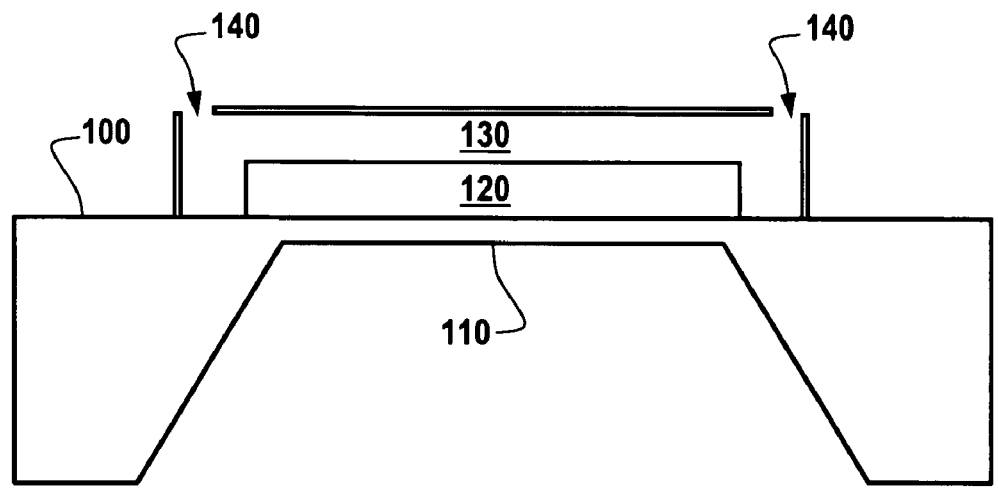
FIG. 2 illustrates a side view of the pressure sensor of FIG. 1 wherein holes are formed within the second layer.

Referring to FIG. 2, another feature of the present invention is illustrated. A second layer 130 is formed on/deposited over the first layer 120. The area of the second layer 130 is patterned to be greater than the area of the first layer 120 and is a different material than the first layer 120. As shown in FIG. 2, holes 140 are formed/etched in the second layer 130. The holes allow the first layer 120 to be removed from under the second layer using methods known to those skilled in the art.

Figure 3:
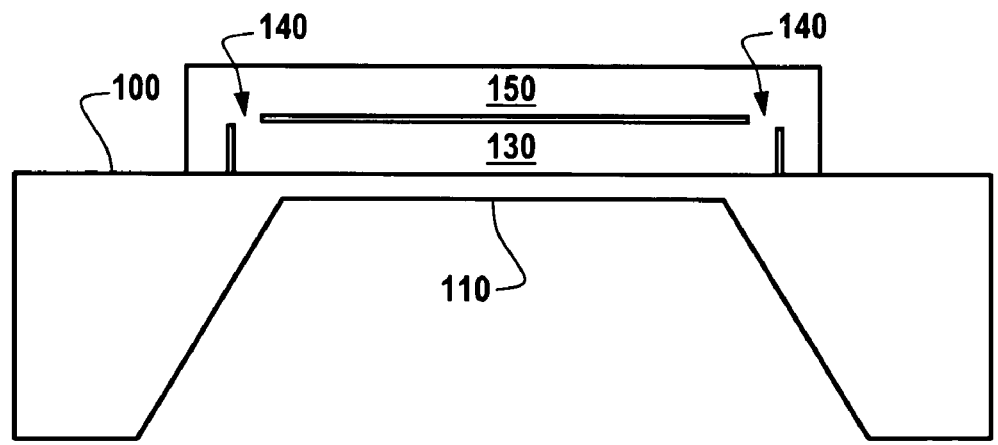
FIG. 3 illustrates a side view of the pressure sensor of FIG. 2 wherein the first layer has been removed and a sealed cavity has been formed by a third layer applied over the surface of the second layer.

Referring to FIG. 3, another feature of the present invention is illustrated. As shown in FIG. 3, a third layer 150 is formed on/deposited over the second layer 130. The third layer 150 is patterned and can be the same material. The third layer 150 when used in this embodiment of the invention seals the holes in the second layer 130 and creates the reference cavity on the topside of the diaphragm 110.

The invention is preferably made using photolithography, deposition and/or etching techniques familiar to those trained in the art of semiconductor processing. The first layer 120 using a material such as oxide is deposited over a surface of the silicon wafer of sufficient thickness that when removed later will create a cavity over the diaphragm 110 and is patterned to overlap the diaphragm.

A material with different chemical properties than the first layer 120, such as a silicon nitride, is deposited as the second layer 130 over the wafer that will form the cap and is patterned to overlap the first layer 120. The holes 140 can be created in the second layer, using a laser or other methods well known to those skilled in the art, to create the openings in a precise location and dimension that will enable the first layer 120 to be removed from under the second layer 130. This can be done by etching the first layer through the created openings 140, while leaving the second layer 130 as the cap. The openings 140 can then sealed with the third layer 150, typically of the same material as the second layer. The third layer 150 should be preferably created at the pressure required for the reference cavity. This seals the reference pressure on the topside of the diaphragm 110.

Semiconductor fabrication processes are in general well known. In accordance with a novel method for fabricating a pressure sensor in accordance with providing features and advantages of the present invention, the following steps can be followed:

providing a silicon substrate 100 with the structures for converting the pressure to an electrical signal and connections to the package using methods that are well known to those skilled in the art on the topside of the substrate 100;

etching a diaphragm 110 within the bottom surface of the substrate using methods that are well known to those skilled in the art;

disposing a first layer 120 on the topside surface of the silicon substrate 100, covering the diaphragm 110, said first layer 120 is patterned to have a larger area than the diaphragm 110;

disposing a second layer 130, of a different material than the first layer 120, over the first layer 120 and the diaphragm 110, said second layer 130 is patterned to have a larger area than the first layer 120;

forming holes 140 within the second layer 130 using a laser or other methods well known to those skilled in the art;

removing the first layer 120 from under the second layer 130 through the holes 140;

disposing a third layer 150 over the second layer 130 at a reference pressure sealing the holes 140 in the second layer 130 and creating a sealed cavity over the diaphragm 110 thereby providing the reference pressure on the topside of the diaphragm 110.

Referring again to FIG. 3, in accordance with methods of using the present invention, it is well known that a pressure sensor diaphragm 110 must be exposed to the media being measured, recorded and analyzed. Electronic systems used for obtaining measurements from a sensor for further analysis and/or recording are well know. According, a novel method of using the pressure sensor 100 described in accordance with features of the present invention can include the steps of exposing the backside of the diaphragm 110 to a media, wherein the pressure sealed in the cavity on the topside of the diaphragm 110 can be used as a reference pressure to measure the media pressure.

During operations, the media will be applied to the bottom surface of the diaphragm 110. This method exposes only the silicon to the media that can be corrosive such as auto exhaust fumes. This novel method provides a more robust and reliable sensor by preventing exposure to the media of the topside of the silicon 100 that has materials other than silicon deposited upon the surface.

The embodiments of an invention in which an exclusive property or right is claimed are defined as follows:

1. A pressure sensor comprising:
   a silicon substrate with a backside etched diaphragm having a top and bottom surface and an outer perimeter;
   a first layer is formed on the topside surface of the diaphragm, said first layer having an area that is larger than the diaphragm;
   a second layer is formed over the first layer and on the topside surface, said second layer having an area larger than the first layer, wherein holes are formed in the second layer;
   the first layer is then removed from under the second layer through the holes leaving a cavity between the second layer and the topside of the diaphragm;
   a third layer is formed over the second layer at the desired reference pressure and on the topside surface;
   wherein said third layer seals the holes in the second layer creating a sealed cavity providing the reference pressure on the topside of the diaphragm.

2. The pressure sensor of claim 1 wherein holes are formed in the second layer, using a laser or other methods well known to those skilled in the art to create the openings in a precise location and dimension.

3. The pressure sensor of claim 1 wherein the first layer is removed through the holes leaving the second layer intact and a cavity between the second layer and the topside of the diaphragm.

4. The pressure sensor of claim 1, wherein the third layer seals the holes in the second layer at a reference pressure creating the sealed cavity and providing the reference pressure on the topside of the diaphragm.

5. The pressure sensor of claim 1, wherein media can be applied to the bottom surface of the diaphragm thereby eliminating exposure of the topside of the sensor to the media.

6. The pressure sensor of claim 1, further comprising an electronic circuit connected in signal communication with the diaphragm.

7. A method for fabricating a pressure sensor comprising the steps of:
   providing a silicon substrate with a backside etched diaphragm having bottom and top surfaces and an outer perimeter;
   disposing a first layer on the topside surface of the silicon diaphragm, said first layer having a larger patterned area than the silicon diaphragm;
   disposing a second layer of different material than the first layer over the first layer and the topside surface, said second layer having a larger patterned area than the first layer;
   forming holes within the second layer;
   removing the first layer thereby creating a cavity on the topside of the diaphragm under the second layer;
   disposing a third layer over the second layer and the topside surface at a reference pressure sealing the holes in the second layer thereby creating a sealed cavity at the reference pressure on the topside of the diaphragm.

8. The method of claim 7, wherein said holes through the second layer are formed using a laser or other methods well know to those skilled in the art to create the openings in a precise location and dimension.

9. The method of claim 7 wherein the first layer is removed through the holes leaving the second layer intact and a cavity between the second layer and the topside of the diaphragm.

10. The method of claim 7, wherein the third layer seals the holes in the second layer at a reference pressure creating the sealed cavity and providing the reference pressure on the topside of the diaphragm.

11. The method of claim 7, wherein media can be applied to the bottom surface of the diaphragm thereby eliminating exposure of the topside of the sensor to the media.

12. The method of claim 7, further comprising an electronic circuit connected in signal communication with the diaphragm.

13. A method for using an improved pressure sensor comprising a silicon diaphragm having bottom and topside surfaces and an outer perimeter, wherein the bottom surface has been etched from the backside, a first layer formed and patterned on the topside surface over the diaphragm, said first layer having a larger area than the diaphragm; a second layer formed and patterned over the first layer and on the topside surface, said second layer having a larger area than the first layer, holes formed in the second layer, the first layer removed from under the second layer through the holes forming a cavity between the second layer and the top of the diaphragm, and a third layer formed and patterned over the second layer and the topside surface at the reference pressure and sealing the holes in the second layer creating a sealed cavity with the reference pressure on the topside of the diaphragm, said method comprising the steps of:

exposing the backside of the diaphragm to a media, wherein the pressure of the media can be measured with respect to the reference pressure sealed on the topside of the diaphragm; and electronically obtaining a pressure reading from the pressure sensor.

* * * * *